(12) United States Patent
Nakayama

(10) Patent No.: US 6,429,403 B1
(45) Date of Patent: Aug. 6, 2002

(54) SUPPORTING GRID WELDING APPARATUS

(75) Inventor: Kimio Nakayama, Naka-gun (JP)

(73) Assignee: Mitsubishi Nuclear Fuel Co., Ltd., Naka-gun (JP)

( * ) Notice: Subject to any disclaimer, the term of this patent is extended or adjusted under 35 U.S.C. 154(b) by 0 days.

(21) Appl. No.: 09/492,275

(22) Filed: Jan. 27, 2000

(30) Foreign Application Priority Data

Jan. 27, 1999 (JP) .......................................... 11-019134

(51) Int. Cl.[7] .............................................. B23K 26/22
(52) U.S. Cl. .............................. 219/121.82; 219/121.63
(58) Field of Search ................. 219/121.63, 121.64, 219/121.82, 121.86

(56) References Cited

U.S. PATENT DOCUMENTS 5,221,515 A * 6/1993 Thiebaut et al. ........ 219/121.64
5,726,418 A * 3/1998 Duthoo ................... 219/121.63
5,808,271 A * 9/1998 Duthoo ................... 219/121.64

FOREIGN PATENT DOCUMENTS

JP      2000-214285 A    *  8/2000

OTHER PUBLICATIONS

U.S. patent application Ser. No. 09/476,084, filed Jan. 3, 2000, pending.
U.S. patent application Ser. No. 09/167,604, filed Oct. 7, 1998.

* cited by examiner

Primary Examiner—Geoffrey S. Evans
(74) Attorney, Agent, or Firm—Oblon, Spivak, McClelland, Maier & Neustadt, P.C.

(57) ABSTRACT

A supporting grid welding apparatus including a welding chamber configured to encase a supporting grid, at least one laser device disposed outside of the welding chamber, and a drive device configured to move the welding chamber independently from said supporting grid.

11 Claims, 5 Drawing Sheets

SUPPORTING GRID WELDING APPARATUS

BACKGROUND OF THE INVENTION

1. Field of the Invention

The present invention relates to an apparatus for welding joint sections of straps and others in a supporting grid, which constitute a part of a nuclear fuel assembly for an atomic reactor.

2. Description of the Related Art

Conventionally, a nuclear fuel assembly used in light water atomic reactors, for example, is comprised by a plurality of supporting grids disposed between an upper nozzle and a lower nozzle that are separated at a given distance, and includes an instrument pipe and a plurality of control rod guide pipe fixed to each supporting grid, upper nozzle and lower nozzle, and fuel rods inserted in the grid spaces of each supporting grid. Each supporting grid is constructed by cross joining the straps made of thin strips in a lattice form.

For example, in the supporting grid 1 shown in FIG. 5, individual inner straps 2 are assembled to form a lattice structure containing a plurality of grid spaces 3, and the joint sections (weld sections) P formed by crossed straps 2 are spot welded using a laser welding apparatus and the like. Further, a sleeve 4 is inserted in a portion of the grid space 3, and the abutting sections Q formed at the cutout section 5 formed at the top and bottom ends of the inner strap 2 are seam welded in a continuous line by using a laser welder. A control rod guide pipe 6 is inserted in each sleeve 4, and the two are locked as a unit by expanding the tubes.

Also, at the intersection points of the inner straps 2 and the outer straps 8 shown in FIG. 6, weld tabs 7 formed on both ends of each inner strap 2 are coupled to respective grooves 8a of the outer straps 8, which are disposed on the four corners of the supporting grid 1, to form a coupling section R (welding section), which is also welded.

The supporting grid 1 thus assembled has an upper surface 1a and a lower surface 1b of a square shape, having many sections to be welded, such as a plurality of joint sections P and butting sections Q, and a rectangular shaped side surfaces 1c having the coupling sections R. Therefore, there is a need to carry out a large number of welding operations in making a fuel assembly.

Welding of supporting grid 1 mast be carried out in an atmosphere containing less than a certain defined level of oxygen and moisture, therefore, welding operations must be carried out in a hermetically sealed welding chamber, and furthermore, because the fumes generated by welding must be exhausted, it is necessary to constantly supply an inert gas into the welding chamber. Welding operations inside the chamber are carried out by using a grid driving device to move the supporting grid 1 inside the chamber to weld the sections such as the joint sections P and the butting sections Q successively, because so many sections to be welded, such as the joint sections P and the butting sections Q, are involved.

However, because of a large quantity of fumes generated during the welding process of so many welding sections of the supporting grid 1, residual fumes inside the chamber, and attach themselves to the glass surfaces that are protecting the laser emitting head from fogging the glass surface, resulting in a problem of lowering the transmission efficiency of laser power through the glass. For this reason, it has been necessary to introduce an inert gas into the chamber and sweep the fumes away with the inert gas externally.

However, in the conventional supporting grid welding apparatus, the grid drive device for moving the supporting grid 1 is located inside the chamber, resulting in a large size for the facility and a corresponding need for a large volume of inert gas as well as a lengthy gas filling process and high cost.

SUMMARY OF THE INVENTION

It is an object of the present invention to provide a grid welding chamber so that welding operations can be carried out efficiently by making the chamber more compact.

The object has been achieved in a supporting grid welding apparatus having a feature that a laser device and a grid drive device are disposed outside the welding chamber, and the grid moving device is used to move the supporting grid relative to the supporting grid.

According to the present supporting grid welding apparatus, the chamber is required to house the supporting grid and it is only necessary to move the chamber slightly relative to the supporting grid. Therefore, compared with the conventional welding apparatus having the grid drive device inside the chamber, the present welding chamber can be made smaller in size, resulting in reducing the time of filling the chamber and the volume of gas required to replace the chamber atmosphere with an inert gas, thus improving the work efficiency and lowering the cost.

When performing welding, the laser device is moved relative to the chamber and the supporting grid so as to position the welding section of the supporting grid at the focal point of the laser beam, and the chamber is moved relative to the laser device and the supporting grid so that the welding section of the supporting grid will be distanced away from the surface through which the laser beam is transmitted.

When performing welding using a high power output from the laser device, such as for spot welding, if the distance between the welding section of the supporting grid and the chamber surface is too short, a plasm gas generated from welding operations can strike the chamber surface (glass) severely to cause thermal damage to the glass, or the fume may adhere to the glass surface, so that it is necessary to move the welding section of the supporting grid away from the glass surface through which the laser beam is transmitted.

It is preferable that the chamber surface, at least in those regions, where the laser beam is to be transmitted, to be constructed of a material transmissive to the laser light. Also, the chamber interior may be filled with an inert gas.

Fumes produced from welding operations can adhere to the chamber surface, resulting in reducing the power of the laser beam transmitted through the chamber surface. Therefore, it is necessary that the fumes remaining inside the chamber be swept with the inert gas to prevent reducing the welding efficiency. According to the present invention, fumes can be eliminated from the chamber efficiently because of the small size of the welding chamber.

DESCRIPTION OF THE PREFERRED EMBODIMENTS

Preferred embodiments will be presented in the following with reference to FIGS. 1 to 4. Those parts that are the same as or similar to the conventional parts are given the same reference numbers.

Figure 1:
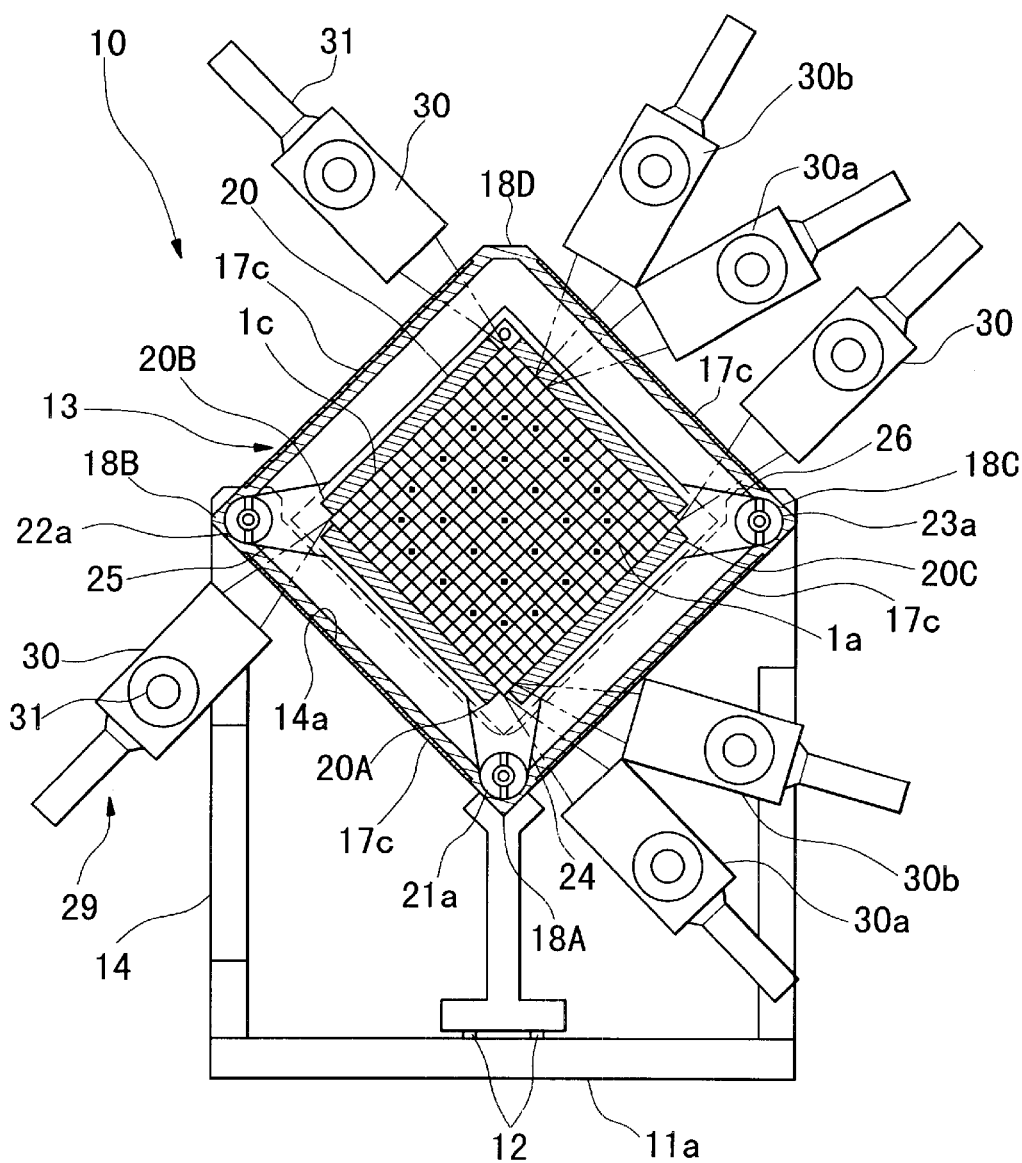
FIG. 1 is a schematic diagram of an embodiment of the supporting grid welding apparatus of the present invention.
Figure 2:
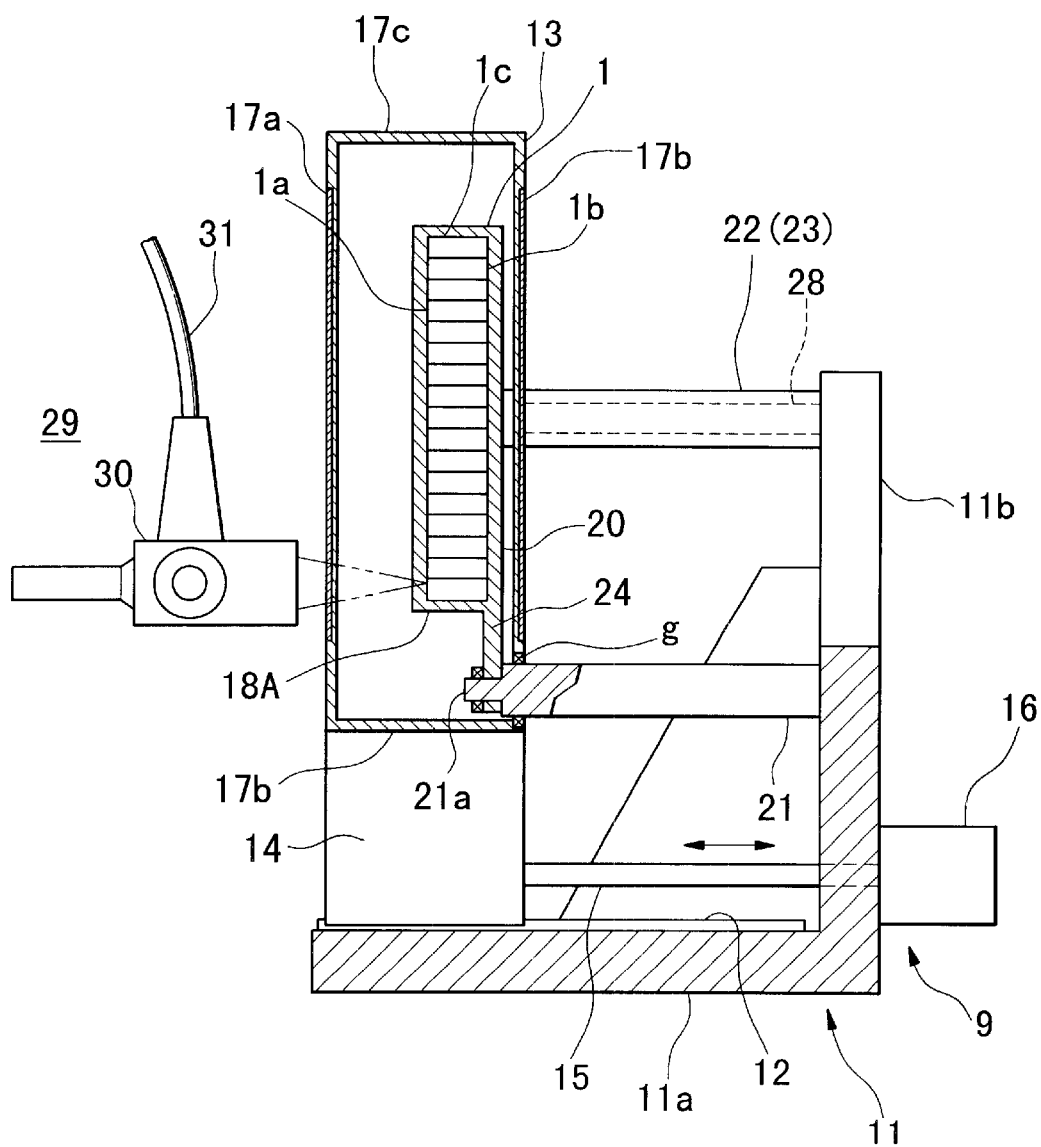
FIG. 2 is an illustration of an welding arrangement for a joint section of one surface of the supporting grid using the welding apparatus shown in FIG. 1.
Figure 3:
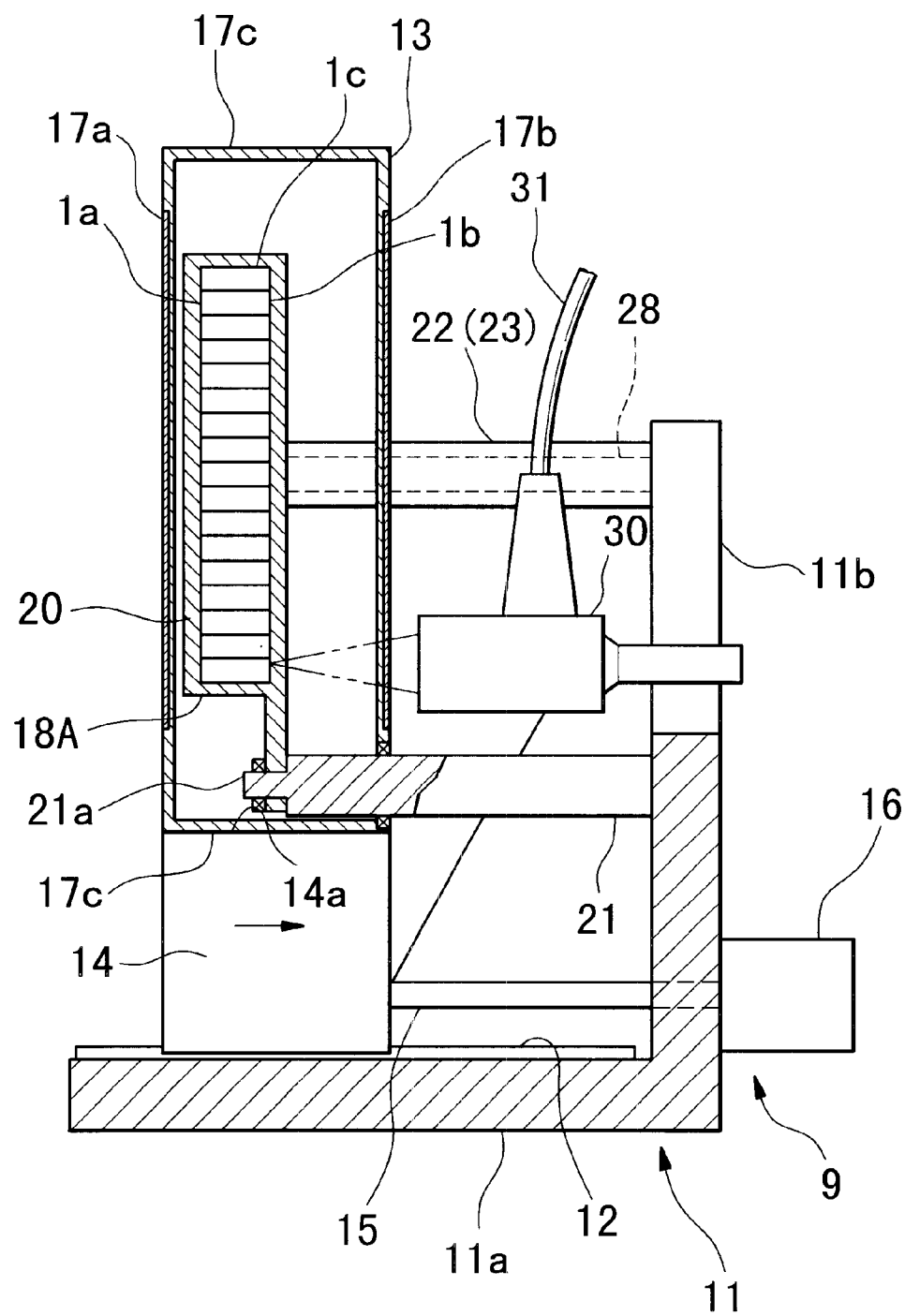
FIG. 3 is an illustration of an welding arrangement for a joint section of other surface of the supporting grid using the welding apparatus shown in FIG. 1.
Figure 4:
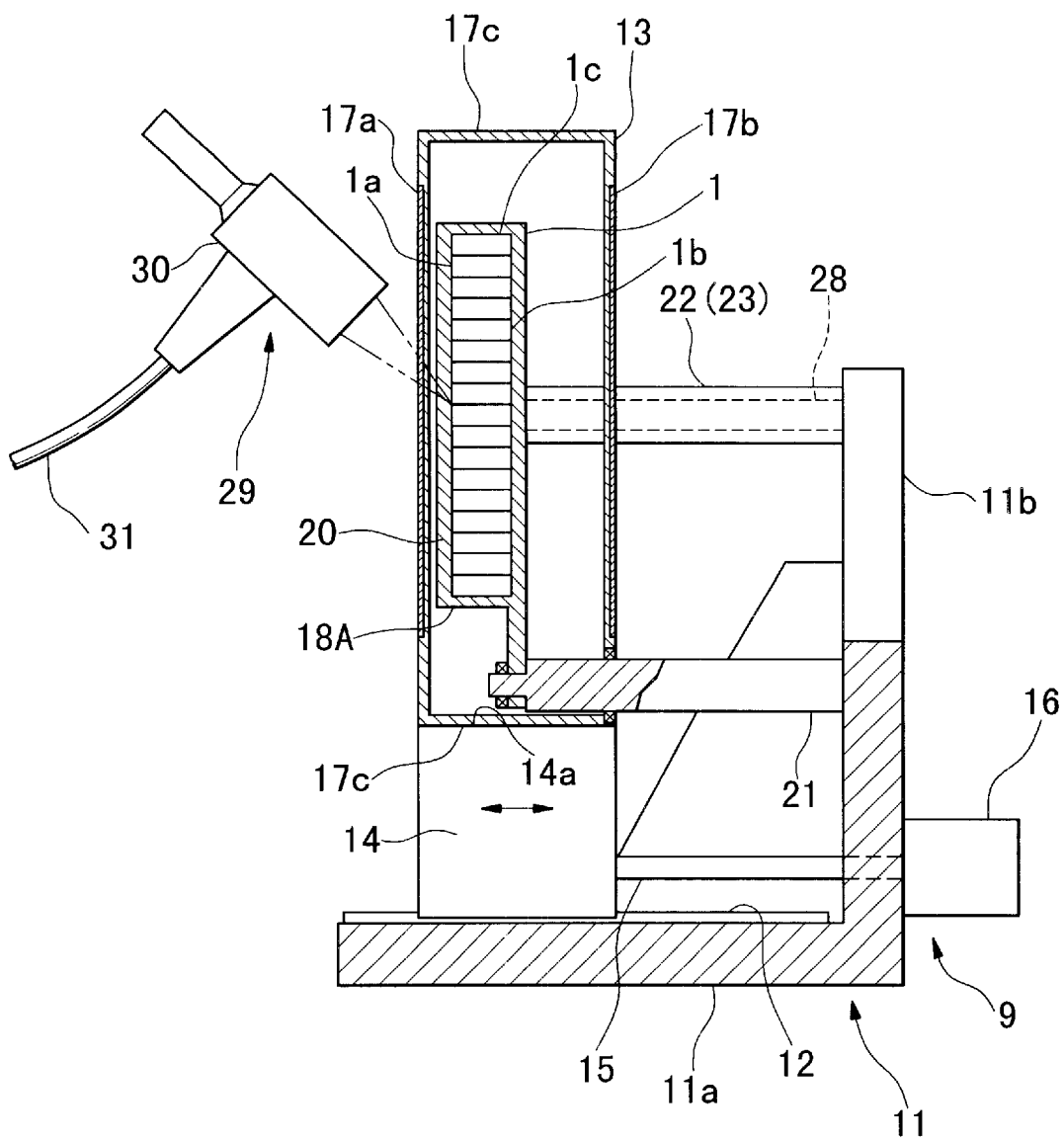
FIG. 4 is an illustration of an welding arrangement for a sleeve section of the supporting grid using the welding apparatus shown in FIG. 1.
Figure 5:
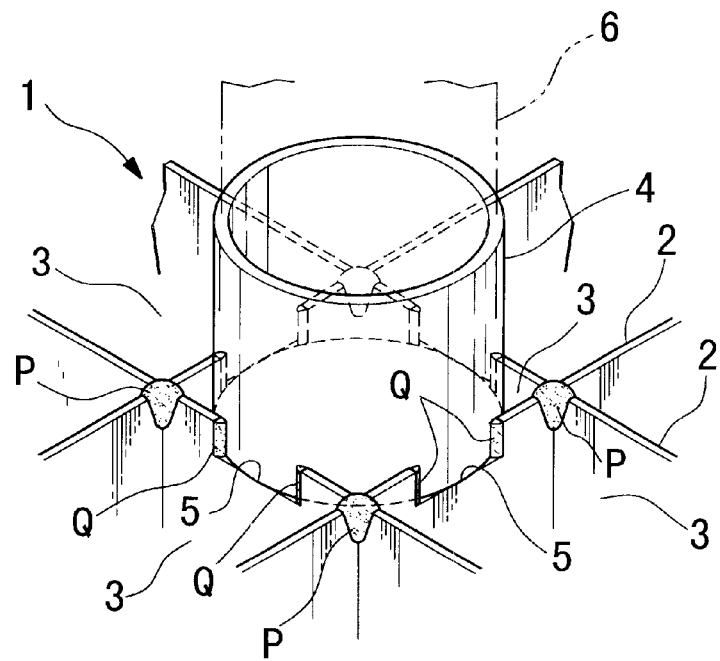
FIG. 5 is a partial perspective view showing the butt section between the joint section and the sleeve section.
Figure 6:
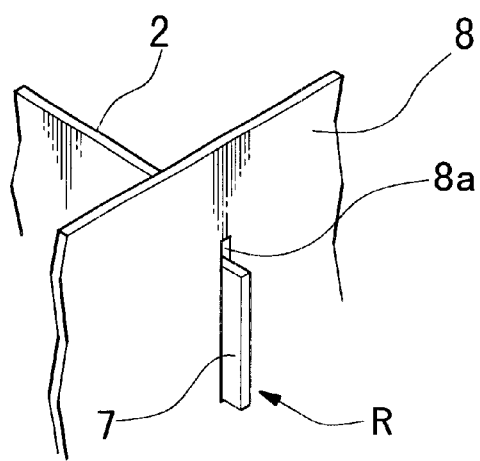
FIG. 6 is a partial perspective view of the coupling section between the outer strap and the inner strap.

FIG. 1 shows an embodiment of the apparatus, and is a front view of the essential parts of the supporting grid welding apparatus. FIG. 2 is a cross sectional side view of the apparatus in FIG. 1, showing a welded joint section on one surface of the supporting grid. FIG. 3 is cross sectional side view of the joint section on other surface of the supporting grid. FIG. 4 is a cross sectional side view of the apparatus for attaching the sleeve section by welding it to the supporting grid.

In the supporting grid welding apparatus 10 shown in FIGS. 1 to 4, a base section 11, having an L-shaped sectional view, is provided with a platform 11a and a lift section 11b, and a pair or parallel guides 12 in a line shape are provided on top of the platform 11a, and above the rail guides 12, a chamber support 14 for supporting the chamber 13 is disposed so as to be able to freely slide on the rail guides 12.

The chamber support 14 is spirally coupled to one end of a rod shaped guide shaft 15 disposed roughly parallel to the rail guides 12 on top of the platform 11a. The guide shaft 15 is provided with a male thread over its entire length, and the other end of the guide shaft 15 is connected to the main shaft of a reversible drive motor 16 attached to the lift section 11b. When the drive motor 16 is operated, the chamber support 14 can be moved forward or back so as to come close to or away from the lift section 11b. The grid drive device 9 is comprised by the drive motor 16, guide shaft 15 and rail guides 12.

The chamber 13 is a six-sided structure and has a square-shaped front surface for housing the supporting grid 1 inside. The height, width and thickness dimensions of the chamber 13 are chosen such that the chamber 13 is somewhat larger than the supporting grid 1. Each surface of the chamber 13 is made of a material such as quartz glass that can transmit the laser beam, and the chamber 13 is comprised of opposing glass surfaces 17a, 17b of roughly square shape, and four side glass surfaces 17c of a roughly rectangular shape, and these chamber surfaces are constructed so that the chamber 13 is hermetically sealed. The opposing two square surfaces of the supporting grid 1 are denoted as an upper surface 1a and a lower surface 1b such that the glass surfaces 17a, 17b face the joint sections P formed on the upper and lower surfaces 1a, 1b.

The chamber 13 is supported on a V-shaped depression section 14a of the chamber support 14, in the lowermost edge section 18A formed by the two adjacent and slanted side glass surfaces 17c shown in FIG. 1, which is one of the edge sections 18A, 18B, 18C and 18D formed by the four side surfaces 17c.

The supporting grid 1 housed in the chamber 13 is supported by a four-sided frame shaped welding jig 20 supporting the four side surfaces 1c of the supporting grid 1.

Support jigs 24, 25, 26 of a plate shape extend from the three edge sections 20A, 20B, 20C of the welding jig 20, respectively. On the other hand, three support rods 21, 22, 23 extend from the lift section 11b of the base section 11 parallel to the guide shaft 15, and their free ends 21a, 22a, 23a are inserted into the chamber 13 at the edge sections 18A, 18B, 18C and are detachably connected inside the chamber 13 to the respective chamber support jigs 24, 25, 26.

The arrangement described above results in the supporting grid 1 inside the chamber 13 being supported by means of the three support rods 21, 22, 23 without being mechanically linked to the chamber 13. The upper and lower surfaces 1a, 1b and four side surfaces 1c of the supporting grid 1 are positioned roughly parallel to the top and bottom glass surfaces 17a, 17b and the side glass surfaces 17c, respectively.

Also, the two support rods 22, 23 disposed on left and right ends are hollow rods each having a hollow tube section 28, through which an inert gas such as He and Ar from an external source (not shown) is introduced into the chamber 13.

For the purpose of maintaining the chamber 13 to be hermetic, a gasket g may be provided at each of the support rods 21, 22, 23 in the insertion section that supports the glass surface 17b.

On the outside of the chamber 13, there is provided a laser injection head 30, representing a component of a laser device 29, which is connected to a laser emitter (not shown) by means of an optical fiber 31. The laser injection head 30 injects a laser light through the chamber 13 for welding of joint section P and other welding sections of the supporting grid 1.

The laser injection head 30 may be connected singly to one laser generator, or a single laser generator may be connected to a plurality of laser injection heads (which may be denoted by 30a, 30b) through a plurality of optical fibers 31 (two fibers, for example) so that a plurality of welding sections (two in the figure) may be welded concurrently.

Methods of welding the supporting grid 1 will be explained in the following, using the welding apparatus 10 having the structure described above.

A supporting grid 1 is supported in the chamber 13 by the three supports rods 21, 22, 23 whose hollow tube sections 28 are used to transport an inert gas in the chamber 13. When the joint section P of the straps 2 of the supporting grid 1 is to be welded, the laser head 30 is positioned at roughly right angles opposite to a surface of the supporting grid 1, for example the upper surface 1a, having the joint section P.

The joint section P is usually spot welded to join the straps 2, therefore, it is necessary to increased the laser power, and a large plasma can be formed by the metallic vapor emitted from the joint section P. For this reason, if a glass surface 17a of the chamber 13 is placed close to the upper surface 1a of the supporting grid 1, the glass surface 17a can be damaged by the heat from the plasma. Therefore, before irradiating with the laser beam, the drive motor 16 is operated to rotate the guide shaft 15, and the chamber support 14 is moved so as to move the glass surface 17a away from the upper surface 1a where the joint section P is located. In this case, because the supporting grid 1 is supported by the support rods 21, 22, 23 and is not linked to the movement of the chamber 13, it enables to adjust the distance between the joint section P and the glass surface 17a of the chamber 13.

In this condition, the laser injection head 30 is moved in the direction at right angles to the upper surface 1a of the supporting grid so as to bring the focal point of the laser injection head 30 on the joint section P to perform welding. Although fusses are generated from the joint section P and dwells inside the chamber 13, fumes can be swept away with the inert gas introduced from the hollow tube sections 28, and is eliminated from the discharge port (not shown) of the chamber 13. In this case, because the chamber 13 is made small, sweeping action by the flowing inert gas is carried out quickly. Also, direct impingement of the plasma gas on the glass surface 17a is prevented by the sweeping action of the inert gas, thereby minimizing thermal damage to the glass surface 17a.

The laser injection head 30 is successively moved along a parallel direction with respect to the upper surface 1a of the supporting grid 1, thereby welding successive joint sections P on the upper surface 1a.

Also, when welding the lower surface 1b, which is opposite to the upper surface 1a of the supporting grid 1, the drive motor 16 is operated in the reverse direction to move the glass surface 17b of the chamber 13 relative to the supporting grid 1 so that the distance between the joint section P of the lower surface 1b to be welded and the opposing glass surface 17b is large, as shown in FIG. 3, and then the focal point of the laser injection head 30 is positioned on the joint section P to perform welding.

Next, to weld the coupling section R (a welding section) between the outer strap 8 and the inner straps 2, the laser injection head 30 is placed opposite to the glass surface 17c of the chamber 13. In this case, welding method is not spot welding but is seam welding, so that the laser beam does not stay in one spot but is moved along a line so that the laser power applied to any on spot is relatively low. Therefore, even if the welding section on the side surface 1c of the supporting grid 1 is placed close to the glass surface 17c of the chamber 13, the size of the plasma generated is small and thermal damage to the glass surface 17c is slight.

Also, to weld the strap 2 to the sleeve 4 attached to the grid space 3, the laser injection head 30 is inclined, as shown in FIG. 4, at a suitable angle in the direction at right angles to the upper and lower surfaces 1a, 1b of the supporting grid 1 so as to avoid interference of laser light by the sleeve 4, and the laser beam is radiated directly on the abutting section Q for welding. In this case, the laser injection head 30 uses the same optical system having the same focal point as the optical system designed for welding joint section P and others, therefore, to place the focal point of the inclined laser injection head 30 on the abutting section Q to the strap 2 and the sleeve 4, it is necessary to move the glass surface 17a of the chamber 13 closer to the upper surface 1a of the supporting grid 1. In this case also, welding is seam welding, so that the laser power is not concentrated on one spot as in the case of spot welding, so that the laser power is relatively low and the resulting plasma is also relatively small. Therefore, even if the welding section of the supporting grid 1 is close to the glass surface 17a, thermal damage to the glass surface 17a is slight.

As described above, in the present supporting grid welding apparatus 10, a laser device 29 and the grid drive device 9 for welding purposes are disposed on the outside of the chamber 13, so that the grid drive device 9 can be used to move the supporting grid 1 relative to the chamber 13. Therefore, compared with the conventional welding apparatus having a drive device inside the chamber, the size of the chamber 13 can be made smaller to enable to quickly perform the task of sweeping the fume with an inert gas. It presents a further advantage that the plasma is prevented from striking the glass surface 17a, 17b, by using a small volume of inert gas for sweeping, so that the efficiency of welding operations can be increased and the cost minimized. Furthermore, one laser device 29 having a single short focal distance can be used for different methods of welding, including spot welding and seam welding, therefore, the energy utilization efficiency is high and the welding task is facilitated.

When the focal distance is shortened, a single laser source can be used to weld a plurality of welding sections by using a plurality of laser injection heads 30a (refer to FIG. 1), and even higher work efficiency can be achieved.

Also, if it is desired to have a long focal distance for the laser injection head 30, the output power of the optical system of the laser device 29 needs to be increased. In such a case, the glass surface 17a of the chamber 13 can be placed away from the abutting section Q of the supporting grid 1 even for welding the sleeve 4, so that thermal damage to the glass surface 17a can be further suppressed.

Also, the chamber 13 may be made stationary and the supporting grid 1 inside the chamber 13 may be translated. In such a case, one of the support rods 21, 22, 23 becomes a guide shaft for translating the supporting grid 1, and the other rods are used to guide the movement of the supporting grid 1.

Also, it is not mandatory that all the six surfaces be made of a glass material, and in such a case, at least the areas required to transmit the laser beam for welding purposes may be made of glass surfaces.

What is claimed is:

1. A supporting grid welding apparatus comprising:
   a welding chamber configured to encase a supporting grid;
   at least one laser device disposed outside of said welding chamber; and
   a drive device configured to move said welding chamber independently from said supporting grid.

2. A supporting grid welding apparatus according to claim 1, wherein said welding chamber is hermetically sealed.

3. A supporting grid welding apparatus according to claim 1, wherein said welding chamber has a plurality of surfaces made of a material configured to transmit a laser beam.

4. A supporting grid welding apparatus according to claim 3, wherein said material comprises quartz.

5. A supporting grid welding apparatus according to claim 1, wherein said drive device includes a welding jig configured to support the supporting grid inside said welding chamber, and a plurality of support rods configured to support said welding jig independently from movement of said welding chamber, and said drive device is configured to move said welding chamber along said plurality of support rods.

6. A supporting grid welding apparatus according to claim 5, wherein said welding chamber comprises a plurality of gaskets positioned to hermetically seal around said plurality of support rods, respectively.

7. A supporting grid welding apparatus according to claim 5, wherein said plurality of support rods comprises at least one support rod configured to inject an inert gas into said welding chamber.

8. A supporting grid welding apparatus according to claim 1, wherein said drive device includes a welding jig configured to support the supporting grid inside said welding chamber, and a plurality of support rods configured to support said welding jig independently from movement of said welding jig, and said drive device is configured to move said welding chamber along said plurality of support rods.

9. A supporting grid welding apparatus comprising:
- a welding chamber configured to encase a supporting grid;
- at least one laser device disposed outside of said welding chamber; and
- moving means for moving said welding chamber independently from said supporting grid.

10. A supporting grid welding apparatus according claim 9, wherein said moving means comprises supporting means for supporting the supporting grid independently form movement of said welding chamber and holding means for holding the supporting grid inside said welding chamber, said holding means being supported by said supporting means.

11. A supporting grid welding apparatus according claim 10, wherein said supporting means comprises injecting means for injecting an inert gas into said welding chamber.

* * * * *